United States Patent [19]
Petty

[11] Patent Number: 5,574,262
[45] Date of Patent: Nov. 12, 1996

[54] NOISE CANCELLATION FOR NON-IDEAL ELECTROSTATIC SHIELDING

[75] Inventor: William K. Petty, Colorado Springs, Colo.

[73] Assignees: AT&T Global Information Solutions Company, Dayton, Ohio; Hyundai Electronics America, San Jose, Calif.; Symbios Logic Inc., Fort Collins, Colo.

[21] Appl. No.: 317,952

[22] Filed: Oct. 4, 1994

[51] Int. Cl.⁶ .............................. G08C 21/00; G09G 3/02
[52] U.S. Cl. .................. 178/19; 178/18; 178/20; 345/173; 345/176; 345/178; 345/179
[58] Field of Search .................. 178/18, 19, 20; 345/173, 176, 178, 179

[56] References Cited

U.S. PATENT DOCUMENTS

| | | | |
|---|---|---|---|
| 3,732,369 | 5/1973 | Cotter | 178/18 |
| 3,974,332 | 8/1976 | Abe et al. | 178/18 |
| 4,185,165 | 1/1980 | Fencl | 178/19 |
| 4,456,787 | 6/1984 | Schlosser et al. | 178/19 |
| 4,497,977 | 2/1985 | Saito et al. | 178/19 |
| 4,631,355 | 12/1986 | Federico et al. | 178/18 |
| 4,636,582 | 1/1987 | Moriwaki et al. | 178/18 |
| 4,644,102 | 2/1987 | Blesser et al. | 178/18 |
| 4,736,073 | 4/1988 | Abernethy | 178/19 |
| 4,788,384 | 11/1988 | Bruere-Dawson et al. | 178/18 |
| 4,853,497 | 8/1989 | Landmeier | 178/18 |
| 4,859,814 | 8/1989 | Sciacero | 178/19 |
| 4,956,526 | 9/1990 | Murakami et al. | 178/18 |
| 5,008,497 | 4/1991 | Asher | 178/18 |
| 5,010,213 | 4/1991 | Moriwaki et al. | 178/18 |
| 5,083,118 | 1/1992 | Kazama | 340/706 |
| 5,124,509 | 6/1992 | Hoendervoogt et al. | 178/19 |
| 5,136,125 | 8/1992 | Russell | 178/19 |
| 5,162,782 | 11/1992 | Yoshioka | 178/18 |
| 5,177,328 | 1/1993 | Ito | 178/18 |
| 5,218,173 | 6/1993 | Garwin et al. | 178/18 |
| 5,218,174 | 6/1993 | Gray | 178/18 |

FOREIGN PATENT DOCUMENTS 0589498  3/1994  European Pat. Off. ........ G06K 11/16

*Primary Examiner*—Wellington Chin
*Assistant Examiner*—Vijay Shankar
*Attorney, Agent, or Firm*—Wayne P. Bailey

[57] ABSTRACT

Cancellation of electrostatic noise in digitizing tablet having a shield supplying a signal proportional to the electrostatic noise which is subtracted from the information signal derived from a digitizing grid. A conductive transparent shield is interposed between a digitizing grid and image source so that the same electro-static noise on both. The shield may be grounded on zero to n−1 edges, n being the number of edges of the shield. An electrical signal is taken from an ungrounded side and supplied as an input signal to a difference amplifier, the other input signal being the information signal from the digitizing grid. The output signal from the amplifier is the information signal with the noise signal component cancelled.

13 Claims, 3 Drawing Sheets

NOISE CANCELLATION FOR NON-IDEAL ELECTROSTATIC SHIELDING

BACKGROUND OF THE INVENTION

1. Field of the Invention

This invention relates in general to digitizing tablet construction and specifically to providing shielding to prevent electrostatic noise interference from adversely affecting the output signal from a digitizing tablet.

2. Description of the Related Art

Digitizing tablet sensor circuits can be adversely affected by ambient electrical and electrostatic noise from light sources, display monitors, and nearby electrically operated devices. Severe interference can be caused by image generators such as television or computer monitor screens when a digitizing grid is placed over the screens for digitizing a generated image.

To reduce this interference, prior art systems insert a conductive shield between possible noise sources and the sensors. The shield is grounded to conduct electrical noise away. Several examples of the prior art illustrate this approach to eradicating unwanted noise and electrostatic interference.

U.S. Pat. No. 4,644,102 shows the use of an electrostatic shield using grounded copper strips vice a grounded copper plate. The grounded copper strips prevent the effects of reversed fields that occur when using a conventional grounded plate. Noise is eliminated or at least reduced by the use of a demodulator coupled to a matched filter instead of a conventional low-pass filter which was considered to have too slow a recovery time.

U.S. Pat. No. 4,636,582 teaches the use of a conductive shield layer coupled to ground to prevent electrostatic interference with handwritten information detected by a pair of conductive layers activated by a writing stylus. Electrostatic noise from the hand of a user or nearby electrical devices interferes with the decoding of signals representing entered information. The shield is intended to ground at least some of the electrical noise.

U.S. Pat. No. 4,497,977 shows the use of an electrostatic shield layer coupled to ground to prevent noise from the hand of a user from causing interference with electrical signals representing information entered via a handheld stylus.

U.S. Pat. No. 3,974,332 describes a system for entering information using a conductive pen capacitively coupled to a tablet for selecting segments on the tablet. The segments are insulated from one another by an electrically conductive grounded shield layer with apertures for the segments. The shield prevents capacitive coupling to segments adjacent to a selected segment, i.e., prevents or at least reduces crosstalk between segments.

U.S. Pat. No. 3,732,369 shows a digitizing tablet having x- and y-coordinate wires that are capacitively coupled to a stylus for supplying signals indicative of the x,y position of the stylus. A conductive ground plane, insulated from the lower wires, is provided.

U.S. Pat. No. 4,956,526 describes the use of a shielding plate placed at a distance from a sensor plate to provide a maximum output voltage signal.

U.S. Pat. No. 4,853,497 teaches the use of pan-shaped nonferrous shield that extends over and close to the sides of a rectangular grid of wires in an electromagnetic digitizer to eliminate edge effects.

U.S. Pat. No. 5,124,509 describes a digitizing device having a conductive plate in an inductively coupled system. The purpose of the plate is not to eliminate or to reduce interference noise. It operates to detect a submultiple of the stylus' oscillator frequency, the latter being used to induce a voltage signal in the associated grid lines. The submultiple frequency is capacitively coupled from the stylus to the user's hand or body. The plate picks up the submultiple frequency and couples it through a phase-locked loop to operate an analog switch. The conductivity of the plate is purposely made low. Also shown is a prior art standard grounded electrostatic shield.

U.S. Pat. No. 5,218,173 relates to materials used in shields for electromagnetic digitizers such as used in notebook computers. The shield plate protects the circuitry from local interference and magnetic fields such as those created by power transformers and the like.

Although accomplishing their purpose, none of the prior art shields are used to supply a noise cancellation signal as shown in the present invention described below in more detail.

These prior art shields are not completely effective, especially in those cases where the shield must be transparent (for placement on an image plane or monitor display screen, for example) while exhibiting low resistance to electrical potentials. The invention to be described improves the performance of electrostatic shielding by cancelling noise from the output signal.

SUMMARY OF THE INVENTION

In accordance with the invention, a noise shield in a digitizing tablet is coupled to ground through a circuit that produces electrical signals proportional to interfering noise and applies the extracted signals to the desired output signal so as to cancel the noise from such output signal. Alternatively, the shield can be grounded at one point and a noise signal taken from a point on an ungrounded edge of the shield.

This is accomplished in a system according to the invention by placing a conductive shield between an image source and a digitizing grid so that the electrostatic noise impressed on the digitizing grid is a duplicate of or is congruent with that which is impressed on the shield (except for possible differences in amplitude). The shield is coupled to ground through an impedance to develop a voltage proportional to the noise potential. The voltage so developed across the impedance is applied to a differential amplifier as is the signal from the digitizing grid so as to supply an output signal proportional to the digitizing grid signal with the noise signal component cancelled.

The shield can also be grounded on one or more sides leaving at least one side or edge ungrounded. A voltage potential can be tapped from the ungrounded side to supply the noise-proportional signal to the differential amplifier.

The noise signal can be conducted to the cancelling circuit via a matching or phase shift network, which may be made adjustable for improving noise cancellation since at least part of the electrical noise may be capacitively coupled to the shield causing a phase shift between the signals on the grid and noise shield.

BRIEF DESCRIPTION OF THE DRAWING

The invention is described in detail by referring to the various figures which illustrate specific embodiments of the invention, and wherein like numerals refer to like elements.

DESCRIPTION OF THE PREFERRED EMBODIMENT

Details of the construction and use of digitizing tablets are set forth in the prior art patents referred to in connection with the background of the invention, supra. Specifically, the following U.S. Pat. Nos. are referenced as showing specific details of digitizing tablets; 3,732,369; 4,956,526; 4,644,102; 4,497,977; and 5,124,509.

In the following description and claims, supplying signals from a digitizing grid includes the case where the signal is taken from the grid per se (U.S. Pat. Nos. 4,644,102 and 5,124,509) or from a stylus inductively, capacitively, or otherwise coupled to the grid (U.S. Pat. No. 3,732,369).

Figure 1:
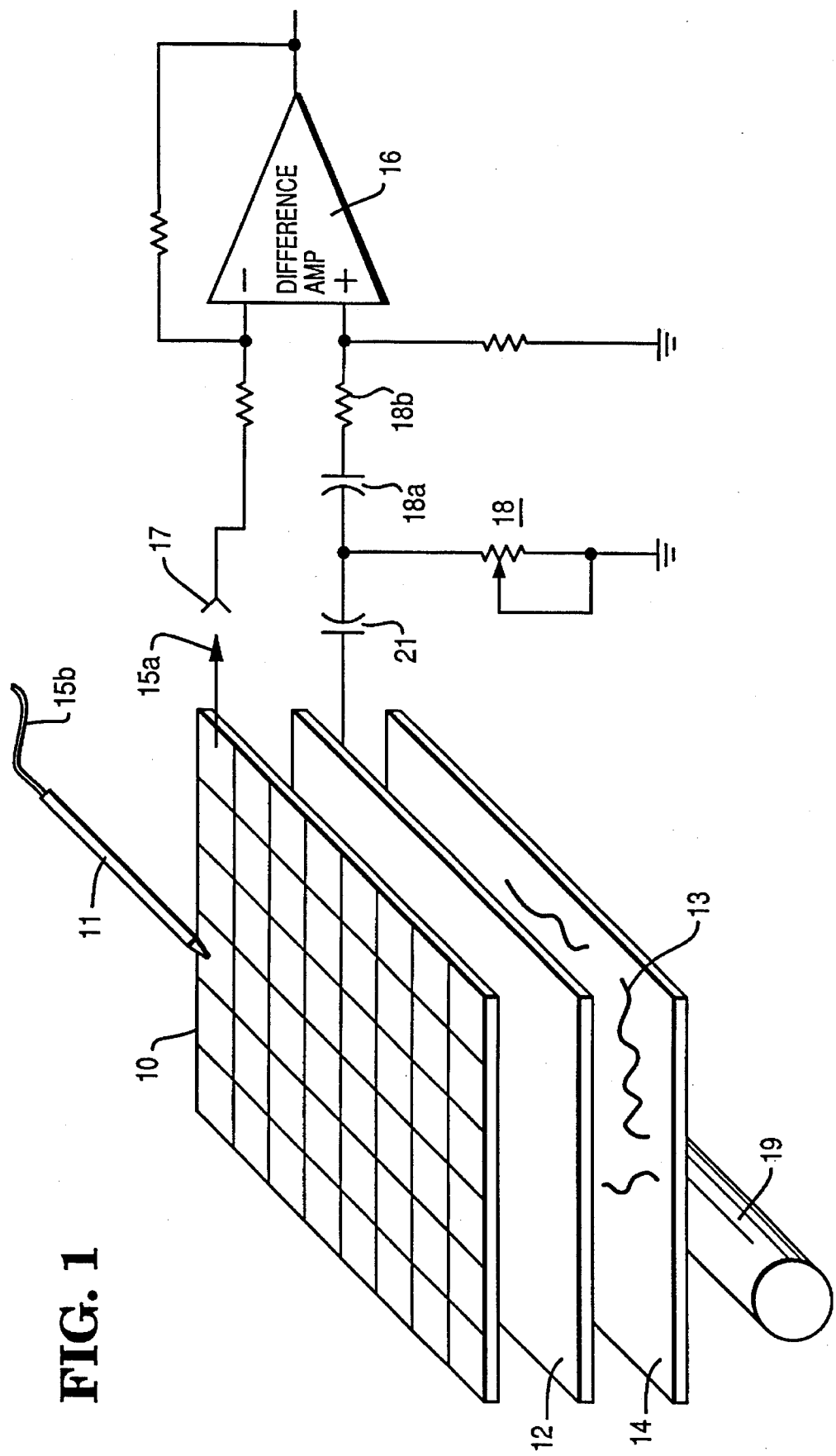
FIG. 1 is circuit diagram showing the principle elements of the invention.

The principle elements of the present invention and their interconnection are illustrated in FIG. 1. A digitizing grid 10 is coupled, via connectors 15a and 17, to an amplifier 16 which includes suitable input and feedback resistors in a manner well known in the art.

The generation of the signal from the digitizing grid 10 or from a stylus 11 (which can be coupled to the amplifier 16 via connectors 15b and 17) is also well known in the art, and need not be described in detail for an understanding of the invention.

A transparent conductive shield 12 is interposed between the digitizing grid 10 and an image plane 14. The image plane 14 and a light source 19 can be any type of image source or image generator, e.g., a television screen or a computer monitor screen. It is well known that such image generators produce substantial amounts of electrical noise interference which prior art grounded plates cannot shield.

The shield 12 and the digitizing grid 10 are spaced so that electrostatic noise 13 passing through the shield 12 to the digitizing grid 10 will be substantially congruent or similar to the noise intercepted by the shield 10. The distance of the spacing between the shield 12 and the digitizing grid 10 is limited by two principal factors. If the spacing is too small, the shield 12 and the digitizing grid 10 form a capacitor which becomes more effective in passing noise signals the closer they are together. If the spacing is too large, a depth field is created and the resulting parallax distortion will cause misplacement of the pen or probe 11 with respect to the image points being digitized. The spacing appears to be optimal between one and two millimeters. The shield may even be implemented as a coating on the face of the display 14, e.g., a cathode ray tube face.

The shield 10 may be fabricated from an indium-tin-oxide (ITO) material, such as is used commercially in the manufacture of liquid crystal displays, because of its transparency and electrical characteristics.

Instead of grounding the shield 12, as is done in the prior art, the shield 12 is coupled to a phase shift network 18 which may be constructed to allow the phase and amplitude of the noise signal from the shield 12 to be adjusted over a desired range.

The phase-adjusted signal from the network 18 is coupled to another input of the amplifier 16 through suitable resistors. The signals are coupled to the amplifier 16 so that the noise signal from the shield 12 is cancelled from the signal from the digitizing grid 10 which includes both noise and information components.

Therefore, in the circuit of FIG. 1, electrostatic and other electrical noise that are included in the signal from the digitizing grid 10, due principally to the image generator 14, will be similar or congruent to that from the shield 12. The noise signals from the image generator 14 are somewhat attenuated by passing through the shield 12 but because the shield 12 is not ideal ¾ having a poor ground impedance ¾ some noise signals will be passed and picked up on the digitizing grid 10.

Coupling the noise signal from the shield 12 to the other input of the amplifier 16 via the network 18 cancels the noise signals from the grid signals thereby leaving only the desired signals from the digitizing grid 10. This results in a cleaner signal, i.e., fewer perturbations in the desired output signal caused by unwanted interference.

The amplitude of the noise signal taken from the shield 12 will normally be larger that its corresponding amplitude on the digitizing grid 10. Differences in the amplitudes of the noise signals taken from the shield 12 and the digitizing grid 10 can be compensated for by amplifying either signal or by adjusting the values of the resistors in the amplifier networks.

Figure 2:
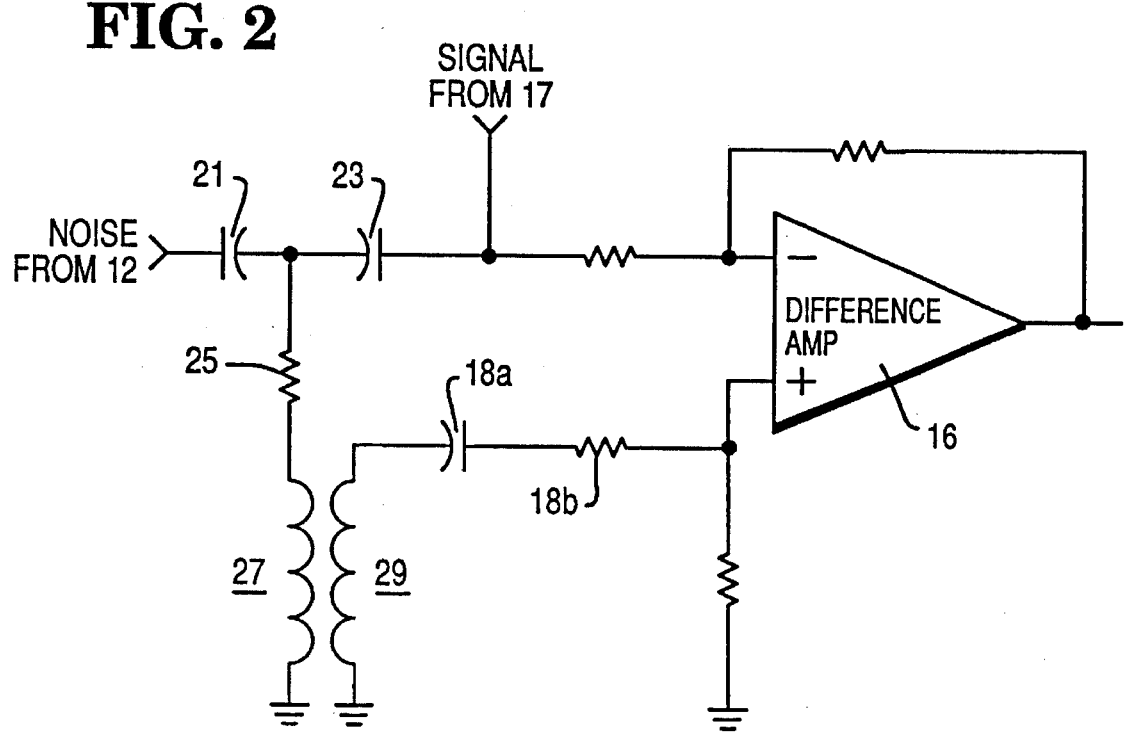
FIG. 2 is a circuit diagram illustrating a coupling circuit suitable for use with the invention.
Figure 3:
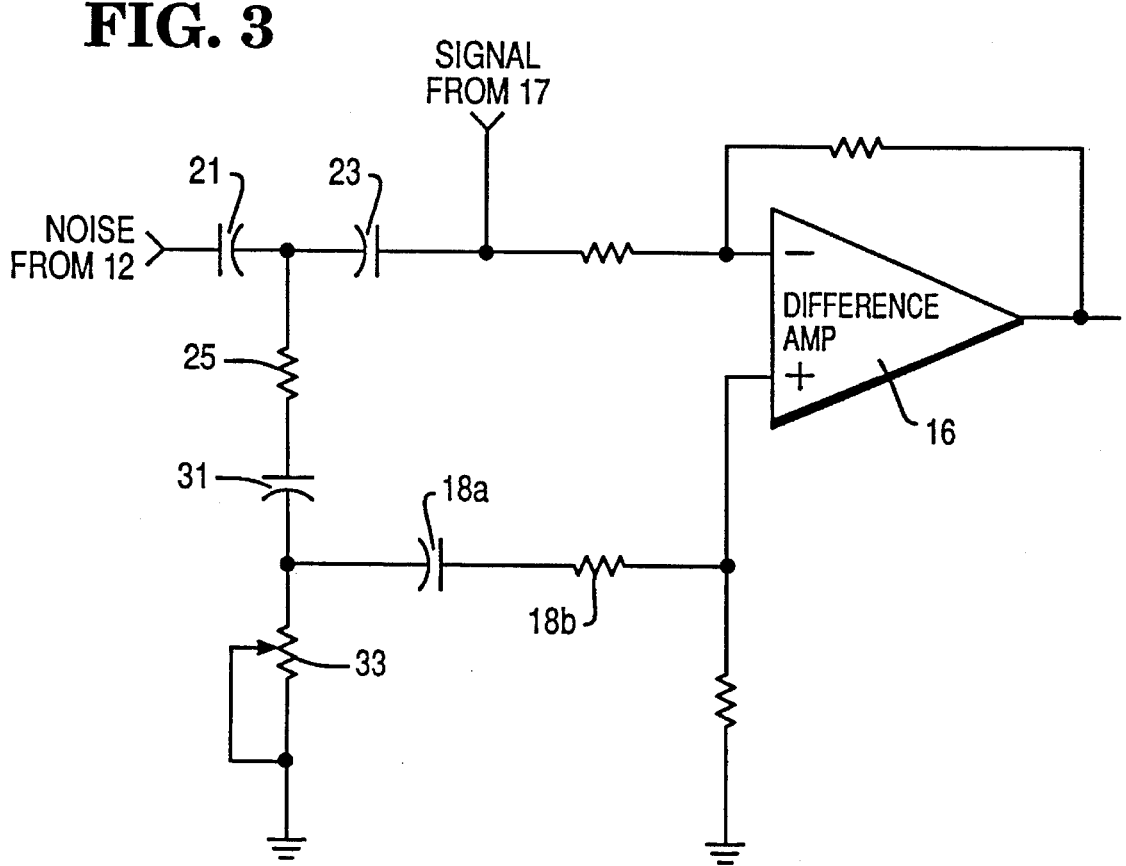
FIG. 3 is a circuit diagram illustrating another coupling circuit suitable for use with the invention.

Other useful methods of coupling the noise from the shield 10 to the amplifier 16 to cancel the noise in the signal from the digitizing grid 10 are shown in FIGS. 2 and 3.

In FIG. 2, the capacitors 21 and 23 represent the equivalent capacitances coupling noise to the shield 12 and to the digitizing grid 10 (signal). The equivalent resistance of the shield is represented by the resistor 25 which is coupled to ground through an inductance 27. Therefore, current created by the noise on the shield 12 passes through the inductance 27.

The current through the inductance 27 induces a voltage in a proximate inductance 29 which is coupled to the amplifier 16 through a phase adjusting circuit comprising a capacitor 18a and a resistor 18b. The signal has the same noise coupled thereto by the equivalent capacitance 23 so that the input signal to the inverting input terminal of the amplifier 16 includes the noise. The output signal from the amplifier 16 does not include the noise since it is removed from the signal by coupling it to the noninverting input terminal of the amplifier 16. (The polarities of the input terminals can be reversed.)

Alternatively, the noise could be subtracted from the signal by reversing the polarity of the inductance 29 and coupling the signal from the phase adjustment circuit resistively to the inverting input terminal and coupling the noninverting input terminal to ground.

Another coupling circuit is illustrated in FIG. 3. The equivalent capacitors 21 and 23 and the equivalent resistance 25 of the shield 12 are the same as described in connection with the circuit of FIG. 2. The electric current from the shield 12, i.e., from the resistor 25, is coupled via a capacitor 31 and a resistor 33 (which can be adjustable as shown) to ground. The voltage developed across the resistor 33 is coupled to the noninverting input terminal of the amplifier 16 via a phase adjusting circuit comprising the capacitor 18a and the resistor 18b, as previously described in connection with the circuit of FIG. 2.

Figure 4:
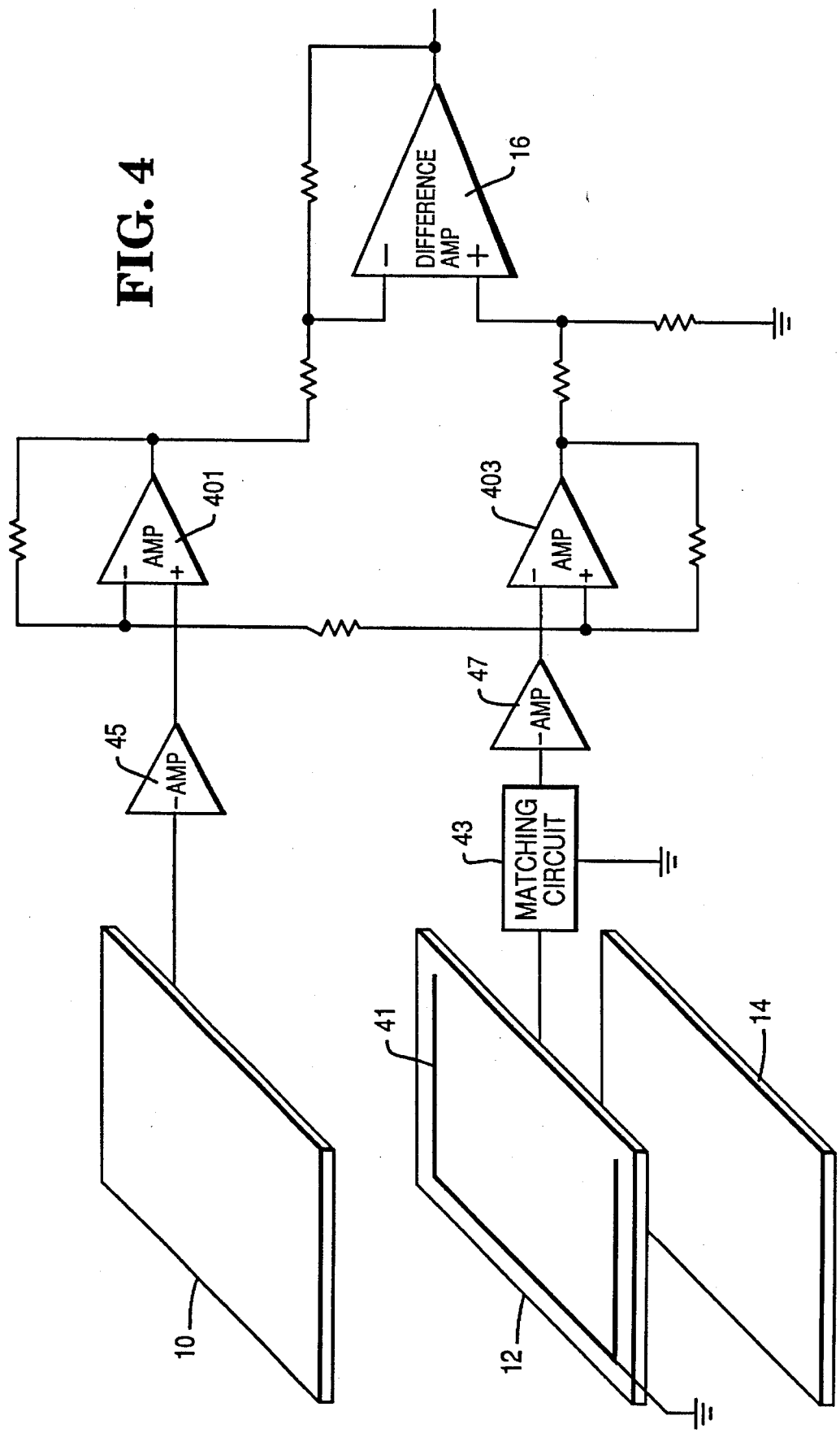
FIG. 4 is a circuit diagram of a preferred embodiment of the invention.

Coupling the shield to ground through impedances can create unwanted signals in addition to the noise because the shield 12 is quasi-floating. To preclude the unwanted signals caused by impedances between the shield 12 and ground, the shield 12 can be grounded on three sides, as shown in FIG. 4, by a ground conductor 41 on the shield. The noise potential can then be taken from a tap point on the ungrounded side of the shield 12 and coupled to a noise amplifier 47 via a matching circuit 43. The matching circuit 43 can include a phase adjustment circuit as previously described.

The noise amplifier 47 and a signal amplifier 45 can be inverting operational amplifiers with suitable input and feedback resistors (not shown) or as unity gain amplifiers by coupling the output terminal to the inverting input terminal and coupling the input signal to the noninverting input terminal. The latter arrangement provides an extremely high input impedance to the input noise and signal sources which helps to reduce signal distortion.

The output signals from the signal amplifier 45 and from the noise amplifier 47 are coupled to amplifiers 401 and 403 coupled as a common mode rejection differential amplifier. The output signals from the amplifiers 401 and 403 are coupled to the output amplifier 16.

This arrangement not only supplies a high input impedance for the signals but also rejects common mode noise to prevent distortion of the signals.

While the invention has been particularly shown and described with reference to a preferred embodiment thereof, it will be understood by those skilled in the art that various changes and modifications in form and details may be made therein without departing from the spirit and scope of the invention according to the following claims.

What is claimed is:

1. A system for reducing electrical interference on a digitizing tablet, the system comprising:

stylus means for producing a position signal representative of a position of the stylus means on the digitizing tablet;

image source means for producing an image to be digitized;

difference amplifier means having a first input means and a second input means for supplying an output signal proportional to a difference between signal values coupled to the first input means and the second input means;

grid means in said digitizing tablet for detecting the position signal from the stylus means and for supplying an input signal coupled to the first input means of said difference amplifier means;

conductive transparent shield means positioned between the image source means and the grid means and being transparent to the image produced by the image source means, said conductive transparent shield means for intercepting electrical interference impressed on the grid means from the image source means and for supplying a noise reference signal proportional to electrical interference intercepted; and coupling means for coupling the noise reference signal supplied by the conductive transparent shield means to the second input means of the difference amplifier means so that the difference amplifier means subtracts the noise reference signal from the input signal.

2. The system of claim 1 wherein said coupling means further includes phase adjustment means for shifting the phase of the noise reference signal coupled to the difference amplifier means to match the phase of electrical interference present in the input signal.

3. A system for reducing electrical interference between a digitizing grid and a stylus, the system comprising:

image generating means for producing an image to be digitized;

digitizing grid means for supplying an output signal indicative of the position of the stylus on a surface of the digitizing grid means, said digitizing grid means also being positioned over the image generating means;

conductive transparent shield means permitting the image produced by the image generating means to be seen therethrough, said conductive transparent shield means, positioned between the digitizing grid means and the image generating means, for sensing any electrostatic noise potential impressed on the digitizing grid means from the image generating means and for supplying a noise reference signal proportional to the electrostatic noise potential;

means for grounding a first edge of the conductive transparent shield means;

difference amplifier means having a first input means and a second input means for supplying an output signal proportional to a difference between signal values coupled to the first input means and the second input means;

first coupling means for coupling a second edge of the conductive transparent shield means to the first input means of the difference amplifier means, said second edge being ungrounded; and second coupling means for coupling the output signal from the digitizing grid means to the second input means of the difference amplifier means.

4. The system of claim 3 wherein the conductive transparent shield means has n edges and wherein zero to n−1 edges of the conductive transparent shield means are grounded.

5. The system of claim 3 further wherein the first coupling means and the second coupling means each include isolation amplifier means.

6. The system of claim 5 wherein the difference amplifier means includes a common mode rejection stage.

7. An apparatus for reducing electrical noise in a digitizing system having a digitizing grid, a stylus, and an image source, said digitizing grid producing a signal corresponding to the position of the stylus relative to the digitizing grid, the apparatus comprising:

a conductive transparent shield positioned between the image source and the digitizing grid for intercepting electrical noise and for supplying a noise reference signal proportional to electrical noise intercepted; and a difference amplifier having a first input and a second input for supplying an output signal proportional to a difference between signal values coupled to the first input and the second input, said first input coupled to the signal produced by the digitizing grid, said second input coupled to the noise reference signal, thereby subtracting electrical noise from the signal produced by the digitizing grid.

8. The apparatus of claim 7 wherein the conductive transparent shield is a conductive coating applied to a surface of the image source.

9. The apparatus of claim 7 wherein the conductive transparent shield is made of indium-tin-oxide material.

10. The apparatus of claim 7 further comprising a phase shift circuit connected between the noise reference signal and the second input of the difference amplifier for shifting the phase of the noise reference signal to match the phase of the signal produced by the digitizing grid.

11. A method for reducing the electrical interference from a noise source in a digitizing system having a digitizing tablet and a stylus, said digitizing tablet producing a grid signal corresponding to the relative position of the stylus, the method comprising:

providing a conductive transparent shield for intercepting electrical interference from the noise source;

positioning the conductive transparent shield between the noise source and the digitizing tablet for supplying a noise reference signal proportional to the electrical interference intercepted by the conductive transparent shield;

providing a difference amplifier having a first input and a second input for supplying an output signal proportional to a difference between signal values coupled to the first input and the second input; and subtracting the electrical interference present in the noise reference signal from the grid signal by coupling the grid signal of the digitizing tablet to the first input of the difference amplifier, and coupling the noise reference signal to the second input of the difference amplifier.

12. The method of claim 11, further comprising the steps of:

adjusting the phase of the noise reference signal to match the phase of the grid signal.

13. The method of claim 11, further comprising the steps of:

adjusting the amplitude of the noise reference signal to match the amplitude of the grid signal.

\* \* \* \* \*